May 16, 1933.  W. J. McGUIRE  1,909,624

BEARING

Filed Feb. 20, 1932

W. J. McGuire, Inventor

By C. A. Snow & Co.

Attorneys.

Patented May 16, 1933

1,909,624

UNITED STATES PATENT OFFICE

WILLIAM J. McGUIRE, OF CEDAR RAPIDS, IOWA

BEARING

Application filed February 20, 1932. Serial No. 594,308.

The present invention has for its primary object, the provision of a means whereby the piston of an engine, mounted for right line sliding movement in the engine cylinder, can be connected to the crank of the crank shaft otherwise than by a rod which is pivoted to the piston.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention..

In the accompanying drawing:—

Figures 1, 2, 3:
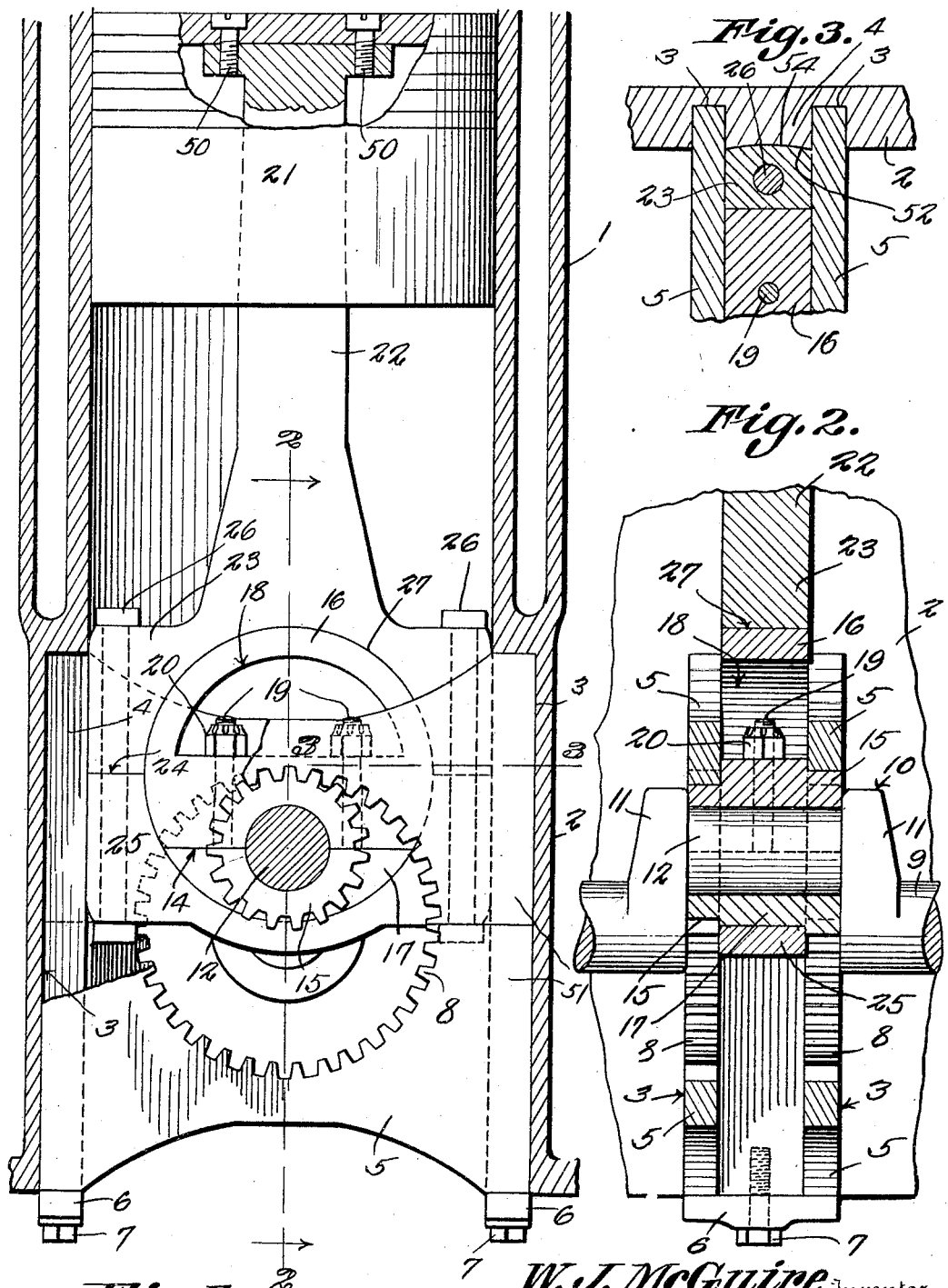
Fig. 1 shows in longitudinal section, a device constructed in accordance with the invention, parts being in elevation.
Fig. 2 is a section on the line 2—2 of Fig. 1.
Fig. 3 is a section on the line 3—3 of Fig. 1.

In the drawing, the numeral 1 marks an engine cylinder, carrying a frame or skirt 2, in the lower end of which there are grooves or seats 3. The grooves 3 are arranged in pairs at the respective sides of the frame, there being a rib 4 between the grooves 3 of each pair, as Fig. 3 will show.

Guides 5, in the form of plates, are mounted in the seats 3 and are held therein by bridge pieces 6 engaging the lower ends of the guide plates 5, securing elements 7 passing through the bridge pieces 6, and into the ends of the ribs 4, so as to retain the bridge pieces in the position shown in Figs. 1 and 2. Internal gears 8 are formed in the guide plates 5.

The numeral 9 designates a shaft, supported for rotation in the frame 2, and having a crank 10, the crank being made up of side arms 11, and a pin 12 connecting the side arms. The pin 12 passes through the internal gears 8.

An eccentric 14 is mounted to turn on the crank pin 12, between the guide plates 5, and has pinions 15 that mesh with the internal gears 8 of the guide plates 5. The eccentric 14 is composed of parts 16 and 17, the part 16 having an opening 18. Studs 19 are carried by the part 17 of the eccentric 14 and extend into the opening 18 through a portion of the part 16 of the eccentric 14. Nuts 20 are located in the opening 18 and are threaded on the studs 19 to hold the parts 16 and 17 of the eccentric 14 together.

A piston 21 is mounted for right line reciprocation in the cylinder 1, and to the piston a rigid stem 22 is attached by securing elements 50, which may be of various forms. The stem 22 carries the inner member 23 of a bearing 24 comprising an outer member 25, the members 25 and 23 of the bearing being held together by securing devices 26, and the bearing 24 having an opening 27 in which the eccentric 14 turns.

In practical operation, when right line reciprocation is imparted to the piston 21, the eccentric 14 turns in the opening 27 of the bearing 24, on the rigid stem 22 of the piston, the pinions 15 cooperating with the shaft 9 by way of the crank 10.

The device hereinbefore described eliminates a wrist pin joint in the piston 21, and makes possible the use of the rigid stem 22 on the piston. By removing the bolts 26, the piston 21 can be lifted out of the cylinder 1, to install new piston rings, without disturbing the crank shaft assembly. The piston stroke can be made as long as desired without taking into consideration the likelihood of interference between the piston rod and the bottom of the cylinder. The structure shown and described makes possible the use of a piston stem of decreased length and makes possible a close proximity between the crank shaft and the cylinder. Moreover, side thrust of the piston against the cylinder is avoided.

The crank shaft arms 11 are one-fourth the length of the piston stroke, and less metal, consequently, is required in making the crank shaft. The length of the throw of the crank is shortened, and this feature, coupled with the fact that the stem 22 has a right line movement, tends to reduce crank shaft vibration.

The guide plates 5 comprise separable parts 51, to facilitate assembly. The pinions 15 have half the number of teeth of the internal gears 8, and are one-half the diameter of the gears 8 at the pitch line. It has been stated hereinbefore that by removing the bolts 26, the piston can be lifted out of the cylinder 1. To make this possible, the rib 4 has a concaved surface 54, as shown in Fig. 3, the surface 54 being a continuation of, and in line with, the cylinder wall; and for a like purpose, the edges of the members 23 and 25 of the bearings 24 are convexed, as appears at 52 in Fig. 3, to fit the convexed surface 54 of the rib 4.

In connection with the removal of the piston 21 through the top of the cylinder 1, it is to be observed that the securing elements 50 (or their equivalent) afford a separable connection between the piston 21 and the stem 22, the securing elements 50 being accessible from the top of the piston 21, so that the piston can be removed from the top of the cylinder, leaving the stem 22 in place.

The device operates upon the principle of the epicycloidal wheel, according to which, if a circle is rolled around the inside of another circle of twice the diameter, any point in the circumference of the smaller circle travels in a straight line, and on a diameter of the larger circle.

What is claimed is:—

In a device of the class described, a frame provided with oppositely-disposed parallel seats which open through one end of the frame, plates having parallel oppositely-disposed edge portions received in the seats and insertible thereinto through said end of the frame, the plates being provided with internal gears, means for holding the plates removably in the seats, a shaft supported for rotation and having a crank including a pin portion extended through the internal gears, an eccentric mounted to turn on the pin portion of the crank, between the plates, the eccentric comprising two parts, between which the pin portion of the crank is located, one of said parts of the eccentric having an opening, means for holding together the parts of the eccentric, the said means being accessible from the opening, pinions connected to the eccentric to turn therewith and meshing with the internal gears, a cylinder, a piston slidable in the cylinder, a stem rigidly secured to the piston, a multi-member bearing, one member of the bearing being carried by the stem, the bearing being slidable between the plates, and means for holding together the members of the bearing, the bearing having an opening in which the eccentric turns, the opening of the bearing being located partly in one member of the bearing and partly in the other member thereof.

In testimony that I claim the foregoing as my own, I have hereto affixed my signature.

WILLIAM J. McGUIRE.